July 29, 1930.    H. McGHEE    1,771,803
PRESS CURE MOLD FOR THE PRODUCTION OF RUBBER SOLED FOOTWEAR
Filed Feb. 21, 1929
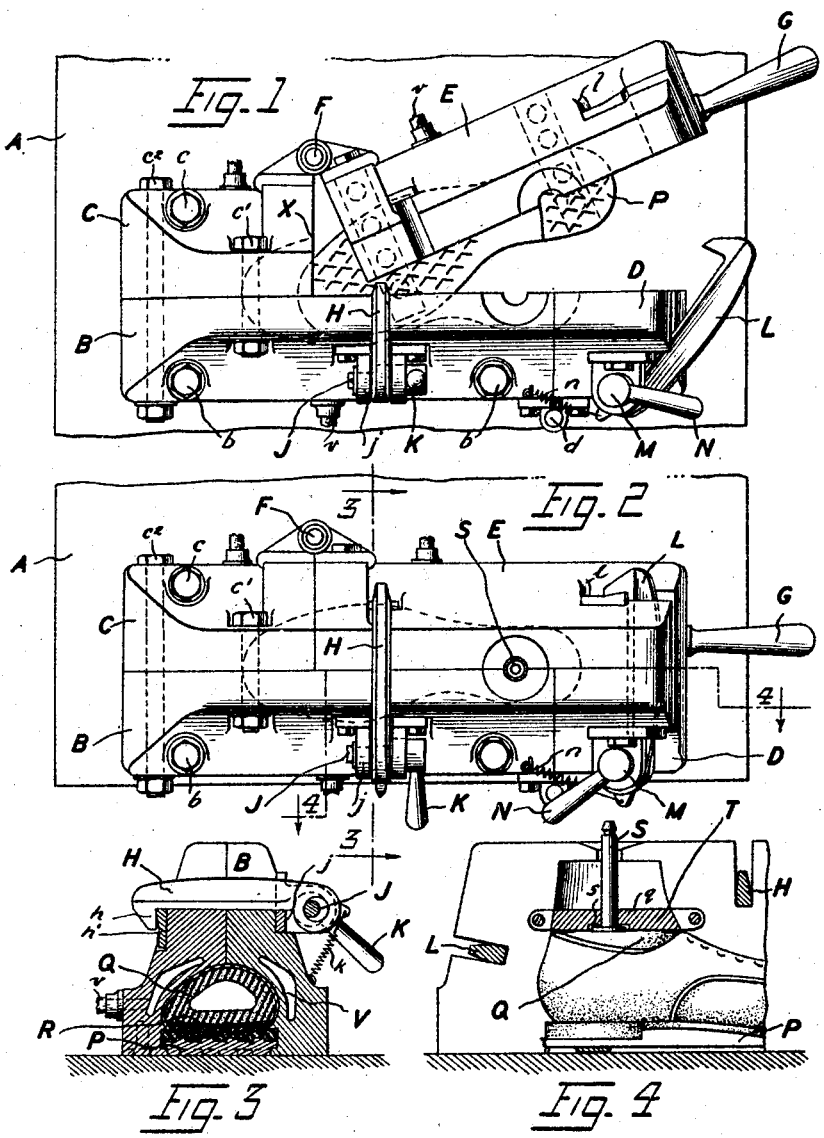

Patented July 29, 1930

1,771,803

UNITED STATES PATENT OFFICE

HENRY McGHEE, OF RUSHCUTTERS BAY, NEAR SYDNEY, NEW SOUTH WALES, AUSTRALIA

PRESS-CURE MOLD FOR THE PRODUCTION OF RUBBER-SOLED FOOTWEAR

Application filed February 21, 1929. Serial No. 341,790.

This invention relates to molds for press curing footwear having uppers of woven fabric or of leather, and sole pieces of rubber integrally united to the uppers by vulcanization in situ.

Practical operating difficulties have developed themselves in the press curing of the before-mentioned type of footwear. Usually the molds have been constructed in two parts, one of which is fixed down to a hot table, and the other hingedly connected at one end of it to the fixed part, so that it may be swung open to admit and release the goods, and swung inward to inclose them, means being provided for locking the two sections together in the closed position.

The first practical difficulty encountered in practice is pinching of the top sides of the uppers, particularly about the toe area, in the closing movement of the mold sections. The pinching which then takes place results in a cutting through of the upper in many cases, and in other cases the leaving of a seam line which affects the appearance of the goods and not infrequently weakens them so that they are liable to split. The second difficulty is insufficient facility for insertion and removal of the goods. It is highly important that the green goods should be insertible and the cured goods removable from the mold with minimum labour, and with minimum risk of burning the hands of the operator, and it is also of great importance that effective locking arrangements be provided, whereby springing of the mold sections apart will be prevented when a pressure inflation within the goods is distended. Springing apart will result in the marking of the goods along the joint line of the mold, and failure in the locking devices will result disastrously in the blowing open of the mold when the inflation is distended.

Molds according to the present invention are characterized in that the joint line between the mold sections is right-angled and the toe portion of the mold is a pocket which does not open apart laterally. Further, in that the floor plate of the mold is carried by the movable section so that when the movable section is swung open the cured boot or shoe is drawn out of the fixed section of the mold cavity by it, and exposed full length so that it can be removed with maximum facility. Similarly, insertion of the green goods may be effected with maximum facility, as they may be conveniently introduced onto the floor plate when the movable section of the mold is at the open position; owing to the fact that the movable section of the mold is short instead of as heretofore the full length of the mold, and owing also to the fact that the centre about which the movable section swings is offset from the centre line of the mold, a very stiff mold is provided and risk of springing is minimized.

In order to protect leather uppers from heat injury in the press cure operation, the mold sections are formed with cellular cavities with water circulation connections, whereby water may be circuited through the molds to maintain the upper portions of them in desirably low temperature conditions whilst permitting the floor plate to come to the necessary high temperature condition for effecting satisfactory vulcanization.

The molds are mounted on a hot table through which heat is transmitted upwardly to them, the table itself being heated by gas or by steam, or maybe electrically. Heating arrangements are such that the floor plates of the molds under operating conditions may be brought to a temperature about 320° F. more or less. A range of molds may be mounted on a single hot table, and the respective operatives may work side by side, the side space required for the handling of the goods being a minimum so that although the operators are closely placed, they do not interfere with each other's work.

In the accompanying drawings:—

Fig. 1 is a top plan of a mold as it appears when in the partly open position, portion of the hot table on which it is supported being indicated;

Fig. 2 is a similar view showing the same mold in fully closed and locked position;

Fig. 3 is a transverse section on the plane 3—3 Fig. 2; and

Fig. 4 is an incomplete longitudinal section on the line 4—4 Fig. 2.

The mold bodies are of metal, preferably aluminium. They comprise four main parts. The portion B is the fixed member. It is secured down to the table A by studs $b$—$b$. The counterpart toe section C is cross bolted to the section B and is fixed down to the table A by a stud $c$. The cross bolts are marked $c'$ and $c^2$. The sections B and C might be a single casting, but fitting and finishing are facilitated by building them as shown and cross bolting the one to the other. The forward end D of the fixed section is hinged to the main portion B of that section at $d$. This portion D may be swung on the pivot $d$ to clear the heel portion of the goods in the opening and closing movement of the mold. The gate portion E of the mold is carried by a heavy pivot F on the forward corner of the counterpart toe section C of the fixed part of the mold. It is armed with a handpiece G to facilitate opening and closing movement. The metal sole plate P which is embossed or engraved in any desired manner to mark the thread surface of the sole, is fixed in the gate section E of the mold. It is fitted in a groove joint, and the mold sections B, C, and D are grooved around the foot to facilitate closure and tight jointing as seen at the section Fig. 3. The joint at X, Fig. 1 needs to be chamfered out a little to provide clearance. As the sole plate P insets in the grooves in the mold sections, an adequate abutment for the downward acting pressure is provided and risk is eliminated of extrusion of the sole rubber through the joint when pressure is applied in the cavity by distention of the flexible inflation Q. V are the water cavities in the mold body. They are provided with appropriate flexible water circulation connections $v$, to enable the cooling of the mold sections when leather upper goods are being cured in order to prevent injury to the leather uppers by excessive heat. The toe portion of the goods is accommodated in the pocket, which is formed in the two fixed members B, C, of the mold. The joint is neatly finished so that it does not show any impressed mark on the toe portion of the goods.

The gate section E of the mold is, when closed, locked to the section B and to the section D by yoke clasps fitted with eccentric pintles. The clasp H swings on a pintle J, and its hooks end $h$ is undercut to provide a non-slipping bite on a hardened staple plate $h'$. The socket $j$ which carries the pivot pin J is also constructed of hard metal, and is fitted up to the side of the fixed mold section B. The eccentric pin J is operated by a hand lever K and a spring $k$ is provided to open the yoke-clasps mechanically after the handle K has been turned to the open position. The eccentric J is so adjusted that the line of pull is nearly across the centre in the lock position, so that tendency to unlatch is thus minimized. The gate section E is also locked at the forward end to the heel section D at the other side of the mold. This latch is a yoke L which also is carried in an eccentric pivot M, N being the handpiece by which the opening and closing movement is effected. An auxiliary spring $n$ is fitted to provide for self-opening of the yoke L when its hook end has been disengaged from the staple plate $l$ by turning the pin M. The pin M is carried in a hard metal bracket fitted up to the side of the mold section D, and the hook of the yoke L is undercut and engages the hard metal staple plate $l$. It is pinned up to the outer side of the mold gate E. The yoke L swings in a horizontal path. The yoke H swings in a vertical path. The gate E swings in a horizontal path. The yokes H and L set in slot-ways (see Fig. 4) cut in the mold section so as to locate the fastening as nearly as practicable across the centre of pressure caused by the distention of the inflation bag Q. The nipple pipe S of the inflation is provided with a flange $s$ which takes under a bridge $q$ which is provided to receive the upward thrust of the inflation Q.

The shape of the sole plate of the mold is adapted to provide a heel lift as seen in Fig. 4. In practice, an insert loose plate R of steel is set over the insole of the goods under the inflation Q for the purpose of ensuring flatness of the floor of the shoe and better distribution of the vulcanizing heat throughout the mass of the sole piece.

When the mold gate E is swung to the open position by means of the handpiece G, after the yokes H and L have been freed by manipulating the hand levers K and N, the mold section D (in the case of a right foot mold) is swung to the left to offer better access to the goods. In the case of left foot molds it swings to the right. The goods are carried on the sole plate P and are exposed accessibly to the operator when the mold is open, so that they may be readily pulled off the sole plate and removed from the mold. Similarly, in the open position of the mold, the green goods are readily insertible on the sole plate P, and as the gate E is closed they are moved inwardly and laterally so that the toe portions come into the pocket Y, and the lateral and heel portions into the complementary cavities in the mold sections B and D.

The lateral-and-forward movement of the gate is a very important feature in the invention. The toe portions of the goods will not suffer injury by joint marking or scoring as the toe pocket is in effect jointless. Better facility is offered than heretofore for the insertion and removal of the goods by the carrying of the goods on the sole plate P and by making this sole plate a fixture on the gate and arranging it to inset around its edges in the groovings in the bottom part of the sections of the mold.

What I claim as my invention and desire to secure by Letters Patent is:—

1. A press cure mold for the production of vulcanized footwear having the fixed section of the mold gnomon shaped, the gate section hingedly mounted thereon at its rear outward corner, a sole plate fixed in the gate, and the other sections of the mold grooved to receive the edges of the sole plate and support the same against internal pressure.

2. A mold as claimed in claim 1 in which the toe portion is a pocket, and the gate of the mold makes a joint with the fixed portions of the mold along a centre line rearwardly of the toe pocket and along a cross line transverse of the toe pocket.

3. A press cure mold having a fixed portion adapted to be secured down to a hot table, a heel piece pivotally secured thereto on the outer side of it, and a gate hingedly carried at its outer rear corner by the fixed toe portion of the mold, with yoke clamps adapted for embracing the gate to the fixed sections of the mold rearwardly and forwardly, substantially as described.

4. A press cure mold as claimed in claim 1 in which a cavity is provided in each of said sections with pipe connections thereto adapted for carrying circulating water through the cavities.

5. A press cure mold having a fixed body portion of gnomon shape, with the toe area formed as a pocket therein, a heel portion pivotally fixed at the outer side of it to the heel of the gnomon and adapted to be swung laterally to open up the heel portion of the mold space, and a laterally swinging gate occupying the bay of the gnomon and hinged to the toe section of the mold at its rear outward corner, with yoke clamps centered on the fixed portion and the swinging heel portion of the mold and engageable with the gate section of the mold.

In testimony whereof I affix my signature.

HENRY McGHEE.